United States Patent [19]
Vemula

[11] Patent Number: 5,891,303
[45] Date of Patent: Apr. 6, 1999

[54] METHOD FOR SEPARATING WAX FROM WASTE PAPER

[76] Inventor: Rohinikumar Vemula, 1 Gina Ct., East Hanover, N.J. 07936

[21] Appl. No.: 6,688

[22] Filed: Jan. 13, 1998

[51] Int. Cl.$^6$ ............................... D21C 5/02; B08B 3/08
[52] U.S. Cl. .................................. 162/5; 134/12; 134/40
[58] Field of Search .................................. 134/5, 12, 40; 162/5

[56] References Cited

U.S. PATENT DOCUMENTS

| | | | |
|---|---|---|---|
| 2,183,259 | 12/1939 | Hill | 162/5 |
| 2,614,922 | 10/1952 | Hope | 162/5 |
| 2,703,754 | 3/1955 | Myers . | |
| 2,742,398 | 4/1956 | ZoBell | 134/40 |
| 2,746,862 | 5/1956 | McDonald . | |
| 2,776,209 | 1/1957 | O'Flynn | 162/5 |
| 3,055,791 | 9/1962 | Elias | 134/5 |
| 3,058,871 | 10/1962 | Davis et al. . | |
| 3,158,531 | 11/1964 | Rohrer . | |
| 3,507,742 | 4/1970 | Rice . | |
| 3,595,741 | 7/1971 | Goss | 162/5 |
| 3,822,178 | 7/1974 | Koeppen et al. | 162/5 |
| 4,048,007 | 9/1977 | Valle-Riestra . | |
| 4,193,838 | 3/1980 | Kelly et al. . | |
| 4,643,800 | 2/1987 | Maloney et al. . | |
| 5,209,785 | 5/1993 | Brewe et al. | 134/5 |
| 5,362,362 | 11/1994 | Cunningham et al. . | |

FOREIGN PATENT DOCUMENTS

| | | | |
|---|---|---|---|
| 447034 | 3/1948 | Canada | 162/5 |

*Primary Examiner*—Harold Y. Pyon
*Assistant Examiner*—Saeed Chaudhry
*Attorney, Agent, or Firm*—Mathews, Collins, Shepherd & Gould, P.A.

[57] ABSTRACT

A method for separating wax from wax containing paper. The method involves immersing the wax containing paper in a heated alkane solvent, preferably n-hexane, to dissolve the wax contained in the paper into the solvent. The dissolved wax and solvent forms a miscella which is later separated from the paper. Any residual solvent absorbed in the paper is removed therefrom. The method also involves retrieving the wax from the miscella.

13 Claims, 2 Drawing Sheets

5,891,303

METHOD FOR SEPARATING WAX FROM WASTE PAPER

FIELD OF THE INVENTION

This invention relates to methods for recycling waste paper products and in particular, to a method for separating wax from wax containing waste paper products using solvent separation and extraction.

BACKGROUND OF THE INVENTION

Several different types of waste paper have potential use as a raw material in making paper pulp, which is used for making paper products. However, many of these waste paper types are not immediately usable as a raw material. Paraffin coated corrugated cartons and wax impregnated papers are examples of waste paper products which are not immediately usable as raw material. These waste paper products are generated by various packaging materials and containers, such as milk cartons, frozen food containers, juice containers, fresh vegetable shipping boxes and the like. In order to make use of these materials as a raw material, the wax must be substantially removed from the paper.

It is known in the art to use various solvents for removing wax, plastic resins, and the like from waste paper products. For example, U.S. Pat. No. 2,708,754 to Myers describes a method of separating wax from paper by immersing wax coated paper chips in a chlorinated aliphatic hydrocarbon solvent. U.S. Pat. No. 4,193,838 to Kelly et al. describes a method for removing thermoplastic resin coatings from paperboard with halogenated hydrocarbon vapors. U.S. Pat. No. 3,595,741 to Goss describes a method for reclaiming paper stock from plastic or wax coated waste paper using a halogenated hydrocarbon solvent.

The halogenated hydrocarbon solvents described in these patents are detrimental to the environment. Government regulations require industry to employ expensive precautionary handling and disposal techniques when these solvents are used. Hence, the cost of recycling wax containing waste paper has increased to the point where it is no longer economical to use such paper as a raw material in making new paper products. Consequently, most wax containing waste paper products are buried in landfills, etc. which is also detrimental to the environment.

Accordingly, there is need for an improved method of recycling wax containing waste paper which is less expensive and environmental safer than prior art methods.

SUMMARY OF THE INVENTION

A method for separating wax from wax containing paper. The method comprises immersing the wax containing paper in a heated alkane solvent, to dissolve the wax contained in the paper into the solvent. The dissolved wax and solvent forms a miscella which is separated from then paper. Residual solvent absorbed in the paper is removed therefrom. The method may also comprise retrieving the wax from the miscella. N-hexane is the preferred alkane solvent used in the method.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

DETAILED DESCRIPTION OF THE INVENTION

The wax to be removed in the method of the invention is generally coated, sprayed or otherwise applied to the surface of the waste paper, or impregnated in the paper fiber. The wax may include paraffin waxes, microcystalline waxes or any other wax used in improving the wet strength or other characteristic of the paper. The waste paper may include post consumer paper, corrugated cartons, waste paper produced in the manufacture of paper products, card board boxes and the like.

Figure 1:
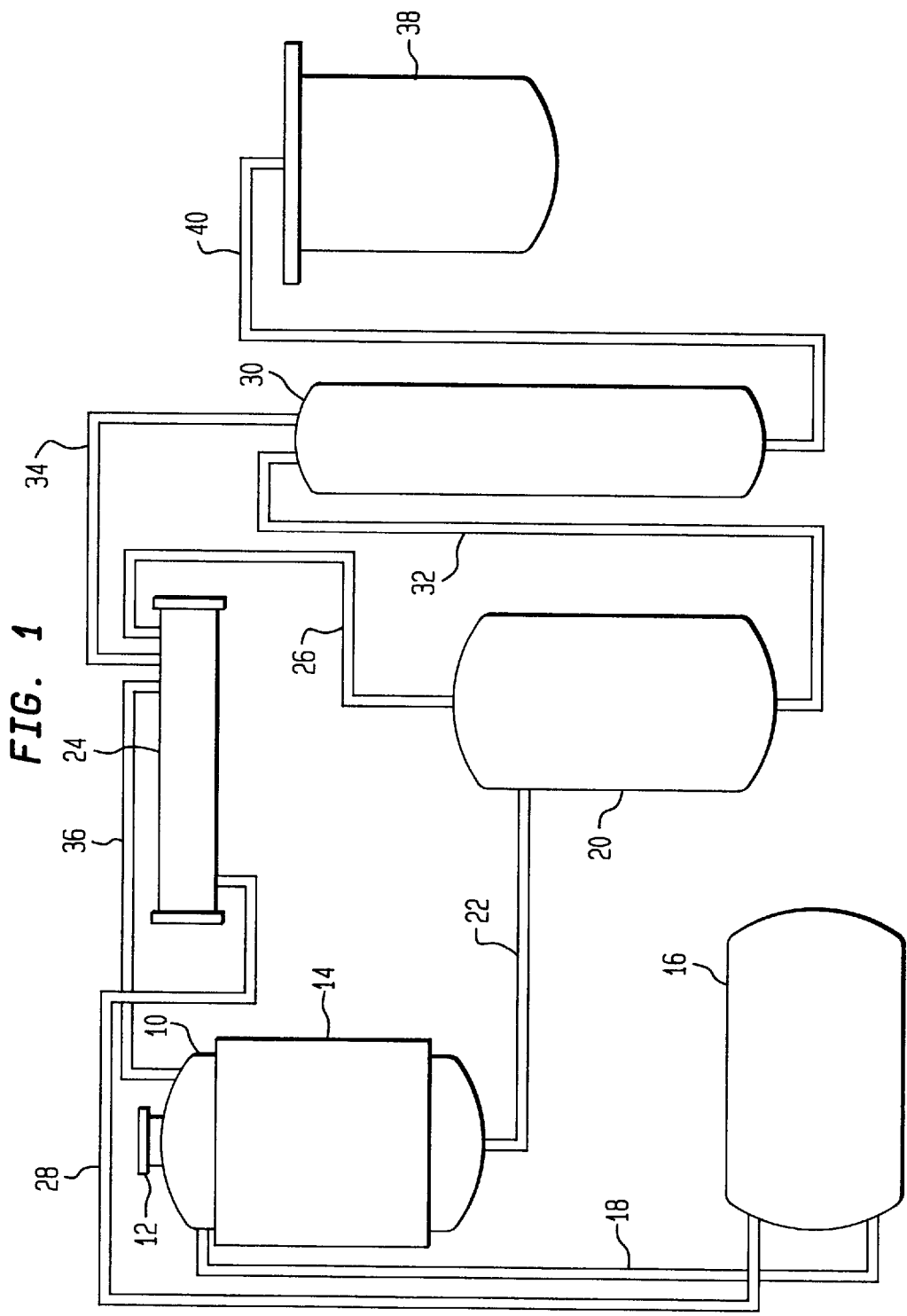
FIG. 1 is a schematic diagram of the equipment used for separating wax from wax containing waste paper in accordance with the method of the present invention.

Referring to FIG. 1, a schematic diagram of the equipment used for separating wax from wax containing waste paper in accordance with the method of the present invention is shown. The equipment used in the method is generally conventional and comprises an extraction vessel 10 (extractor) for immersing the waste paper in solvent. The extractor includes a removable closure or hatch 12 for loading the waste paper into the extractor 10 and a pump (not shown) for circulating the solvent about the paper in the extractor 10 to adequately immerse the paper with the solvent. A steam jacket 14 surrounds the outer surface of the extractor 10. The steam jacket 14 enables the solvent and/or the waste paper contained in the extractor to be heated. A storage tank 16 for holding the solvent used in the method, is coupled to the extractor 10 by piping 18 that delivers the solvent stored in the tank 16 to the extractor 10. A distillation vessel 20 for processing miscella (removed wax solute and solvent) is also coupled to the extractor 10 by piping 22 which delivers the miscella from the extractor 10 to the distillation vessel 20 after the wax is separated from the waste paper. The distillation vessel 20 is coupled to a condenser 24 by piping 26 which in turn, is coupled to the solvent storage tank 16 by piping 28. The distillation vessel 20 is further coupled to a solvent stripper 30 by piping 32 that delivers the wax thereto for further processing. Piping 34 extends between the solvent stripper 30 and the condenser 24, and piping 36 extends between the extractor 10 and the condenser 24. Piping 34, 36 allow vaporized solvent to be condensed and returned to the solvent storage tank 16. A wax storage receptacle 38 is coupled to the solvent stripper 30 by piping 40.

Figure 2:
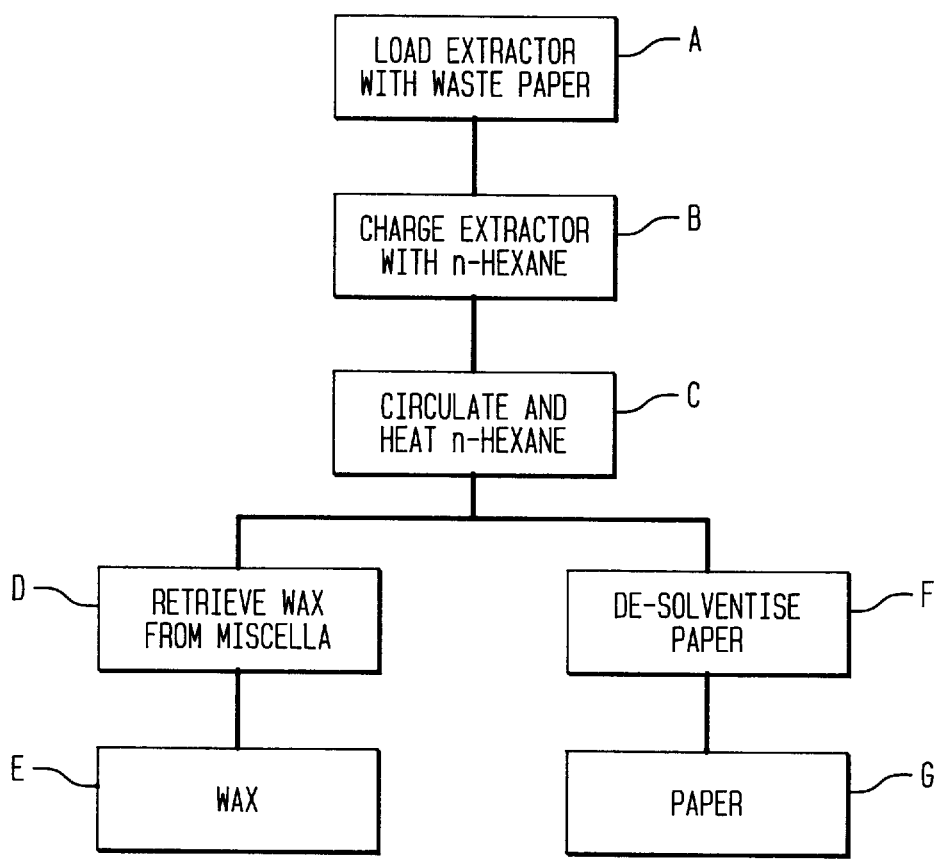
FIG. 2 is a schematic flow diagram showing the steps of the method of the present invention.

FIG. 2 is a schematic flow diagram showing the steps of the method of the present invention. In step A, wax containing waste paper is loaded into the extractor 10 and the closure 12 is secured thereto. The size of the waste paper items is not particularly critical as long as the waste paper can be adequately immersed in solvent for a time period sufficient to substantially separate the wax from the waste paper. Accordingly, the waste paper items can be generally processed as is. However, if deemed necessary, the waste paper items can be cut up into smaller pieces.

In step B, the extractor 10 is charged with solvent that is stored in the storage tank 16. The preferred solvent used in the method is normal-hexane (n-hexane $C_6H_{14}$). Other alkane solvents, such as heptane and octane, may also be used if desired. N-hexane solvent is preferred, however, because it has a relatively low boiling temperature range of approximately 63°–69° C. N-hexane does not react chemically with wax or paper, therefore, the paper and the removed wax can both be easily re-used as raw material in the manufacture of paper products and in other industrial uses. N-hexane is also environmentally safer and much less toxic than prior art solvents, such as Trichloroethylene, and is readily available and inexpensive. Due to n-hexane's relatively low boiling temperature range, it requires less energy in the distillation process of the wax from miscella, and de-solventisation of the paper, as will be explained further on. Additionally, the additives used with the solvents in many of the prior art solvent extraction methods are not required with the n-hexane solvent.

The amount of n-hexane solvent used may vary widely, depending upon the immersion time in the extractor 10 (extraction cycle), the amount of wax in or on the waste paper and the number of extraction cycles which are performed. In a preferred embodiment of the method, a weight ratio of approximately 1.5 tons of n-hexane per 1.0 ton of waste paper is used per extraction cycle.

In step C (the extraction cycle), the pump circulates the n-hexane in the extractor 10 to thoroughly immerse and wash the paper. At the same time, the steam jacket 14 heats the extractor to raise the n-hexane to a temperature above the melting point of the wax in order to increase the wax's ability to dissolve in the solvent, facilitating its removal from the paper. The wax dissolves and mixes completely in the n-hexane solvent when heated together. This temperature generally ranges between 45° C. and 50° C., which is below the 63°–69° C. boiling point range of n-hexane. Steps B and C are preferably repeated between 3 and 5 times in order to substantially remove all the wax from the waste paper. During the processing of a given batch of waste paper, the miscella from a previous extraction cycle is removed from the extractor 10 each time the extractor 10 is charged with n-hexane. The removed miscella is sent to distillation for separation of the wax and n-hexane as will be explained below. Each extraction cycle of step C preferably ranges between 20 minutes and 1 hour in duration. Accordingly, between 4.5 and 7.5 tons of n-hexane will be used per 1.0 ton batch of waste paper processed.

Step D involves distilling the miscella to retrieve the wax contained therein and stripping any residual n-hexane from the retrieved wax. This is accomplished by delivering the miscella to the distillation vessel 20 and distilling off from the miscella at a temperature of approximately 71° C. (just above the boiling point of n-hexane). Since n-hexane has a relatively low boiling temperature, the energy consumed during distillation is minimized. The vaporized n-hexane produced during distillation, condenses in the condenser 24 and is returned to the n-hexane storage tank 16 for reuse in the processing of other batches of waste paper. After distillation, of miscella the remaining material is essentially wax.

The wax is then delivered from the distillation vessel 20 to the solvent stripper 30 which strips any residual n-hexane from the wax. The solvent stripper 30 does this by heating the wax to vaporized any residual n-hexane remaining therein. The n-hexane vaporized in the solvent stripper 30 condenses in the condenser 24 and returns to the n-hexane storage tank 16.

In step E, the wax is removed from the stripper 30 and collected and stored in the wax storage receptacle 38 where it is usable again as a raw material in manufacturing new paper products and other industrial uses.

While the miscella is being processed, the wax-free paper remaining in the extractor 10 after completion of the extraction cycles is wet with n-hexane. In step F, the paper is desolventised by heating the extractor 10 under a vacuum to vaporize the n-hexane remaining in the paper. The vaporized n-hexane removed from the paper condenses in the condenser 24 and returns to the n-hexane storage tank 16.

After de-solventising, step G involves removing the closure 12 of the extractor and removing the paper from the extractor 10. The removed paper is virtually unchanged from its original form and is free from wax and n-hexane. Accordingly, the paper is reusable as a raw material in making new paper products.

It is understood that the above-described embodiment illustrates only one of the many possible specific embodiments which can represent applications of the principles of the invention. Hence, numerous modifications and changes can be made by those skilled in the art without departing from the spirit and scope of the invention.

What is claimed is:

1. A method for separating wax from wax containing paper, comprising the steps of:

immersing said wax containing paper in a heated alkane solvent so said paper absorbs said solvent and wax contained in said paper dissolves into said solvent to form a miscella;

separating said miscella from said paper; and removing said solvent absorbed in said paper.

2. The method according to claim 1, wherein said solvent comprises hexane.

3. The method according to claim 1, wherein said solvent comprises n-hexane.

4. The method according to claim 1, further comprising the step of retrieving said wax from said miscella.

5. The method according to claim 4, wherein said step of retrieving includes the step of distilling said miscella to separate said solvent from said wax.

6. The method according to claim 5, wherein said step of retrieving further includes the step of stripping residual solvent from said wax remaining after said step of distilling.

7. The method according to claim 1, wherein said step of immersing includes the steps of:

contacting said paper with a weight ratio of approximately 1.5 tons of said solvent per 1.0 ton of paper; and circulating said solvent to wash said paper therewith.

8. The method according to claim 7, wherein said heated solvent is at a temperature just above said wax's melting temperature.

9. The method according to claim 8, wherein said step of immersing ranges in duration between 20 minutes and 1 hour.

10. The method according to claim 9, wherein said steps of contacting, and circulating are repeated between 3 and 5 times.

11. The method according to claim 1, wherein said step of immersing ranges in duration between 20 minutes and 1 hour.

12. The method according to claim 1, wherein said step of immersing is repeated between 3 and 5 times.

13. The method according to claim 1, wherein said step of removing residual solvent absorbed in said paper includes the step of heating said paper to a temperature just above said solvent's boiling temperature to drive off said absorbed solvent.

* * * * *